2,757,147

FOAM FROM A VINYL CHLORIDE POLYMER, BUTADIENE-ACRYLONITRILE RUBBER AND A PLASTICIZER

Robert W. Pooley, South Bend, Ind., assignor to United States Rubber Company, New York, N. Y., a corporation of New Jersey No Drawing. Application January 2, 1953,
Serial No. 329,461

6 Claims. (Cl. 260—2.5)

This invention relates to a composition of matter having remarkable shock-absorbing properties.

I have discovered that a material having unusual shock-absorbing characteristics can be obtained by mixing polyvinyl chloride or a resinous copolymer of a major proportion of vinyl chloride and a minor proportion of copolymerizable monomer having an ethylenic group, a rubbery copolymer of butadiene and acrylonitrile, and a high-boiling organic liquid plasticizer for the vinyl resin, in proportions of from 42 to 66% of the vinyl resin, from 20 to 38% of the rubbery copolymer and from 14 to 20% of the liquid plasticizer, together with a suitable amount of a chemical blowing agent and the usual compounding ingredients for the vinyl resin and the rubbery copolymer, and converting this mixture to unicellular vulcanized condition. The above percentages are by weight based on the sum of the three major components named.

The mixtures to be converted to unicellular form are preferably prepared by cold-milling the elastomer component and intimately incorporating therewith at low temperature a separately prepared mixture of the vinyl resin in unfused condition, the liquid plasticizer, the chemical blowing agent, and conventional compounding ingredients including vulcanizing agents for the elastomer and light- and heat-stabilizers for the vinyl resin, in such a way as to form a non-tacky blend in which the elastomer is in the continuous phase. Alternatively, the vinyl resin, plasticizer and stabilizer therefor are fused together on a hot mill, whereupon to this fused mixture the premasticated elastomer is added with continued hot-milling to obtain a homogeneous fused mixture; the blowing agent and vulcanizing agents are then incorporated with the resultant mixture by milling at low temperature, i. e., at not in excess of 180° F.

The shock-absorbing materials of my invention are typically prepared by molding the above-described mixtures under heat and pressure without permitting any substantial expansion thereof, to initiate decomposition of the blowing agent, preliminarily shape the mixture, effect fusion of the resin, elastomer and plasticizer into homogeneous form, and partially vulcanize the elastomer. This molding operation is typically carried out in a platen press at temperatures of from 300 to 325° F. for times of 20 to 40 minutes. After this molding operation, the press is cooled to 100° F. or below, the pre-cured blank is removed and it is then heated, under conditions allowing free expansion, to temperatures of from 325 to 340° F. for 20 to 40 minutes at the end of which time the blank has undergone an enormous increase in volume, typically of the order of tenfold to twelvefold. In addition to expanding the blank to final form, this heating step completes vulcanization of the elastomer. Vulcanization of the elastomer component of my compositions is particularly important from the standpoint of achieving dimensional stability in the final products. The presence of the elastomer permits expanding my compositions at temperatures sufficiently high to relieve all internal strains in a manner which can be likened to annealing. Such relief of internal strains contributes remarkable dimensional stability to the product. Such dimensional stability is not possible if the elastomer is omitted or is not vulcanized. Generally similar blowing methods are shown in Cuthbertson U. S. Patent 2,291,213, and in Daly et al. U. S. Patent 2,570,182.

The product of my invention is unicellular, i. e., it has a closed-cell structure, being composed of a myriad of individual gas pockets which share adjacent walls with each other but which are non-communicating. Its density is usually not over 10 pounds per cubic foot and often ranges from 5 to 8 pounds per cubic foot. Its compressive resistance at 25% compression typically ranges from 4 to 10 pounds per square inch.

The material of my invention is distinguished by its ability to absorb high velocity impact without permanent deformation of the material and with less injury to the impinging body than with materials heretofore used for shock absorbing or protective purposes. For example, sponge rubber and foam rubber which have often been used for these purposes are unsatisfactory because they are too resilient, i. e., the rate of change of acceleration of the impinging body during impact is excessively high.

My material absorbs a large proportion of the kinetic energy of the impinging body and the relatively small amount of this energy which is returned to the body is imparted thereto at a very slow rate. In contrast, sponge and foam rubbers are very lively and return almost immediately to the impinging body substantially all of the energy absorbed, so that their shock-absorbing properties are very poor, contrary to popular opinion.

Certain non-resilient materials, notably balsa wood, have been recognized as possessing good shock-absorbing qualities. However, such materials are incapable of recovery after impact and because they are permanently deformed under impact they are useless for most purposes. In contrast, the material of my invention not only absorbs the shock but fully recovers so that it can withstand repeated impacts indefinitely.

The material of my invention can be described as "dead" as compared with resilient materials like foam or sponge rubber. The rate of recovery of my material is relatively slow so that it imparts to the impinging object only a small portion of the kinetic energy which the object possessed at the instant of impact.

My material is characterized by the fact that the impinging object not only is decelerated at a low rate during penetration so that injury is minimized during this portion of the impact, but equally importantly, is accelerated at a low rate during emergence of the impinging object. Authorities on automotive safety equipment hold the view that injuries to occupants of vehicles are just as likely to occur upon emergence of the affected body member from the surface struck, as a result of the transfer or return of absorbed energy to said member at a high rate, as they are during the initial portion of the impact, i. e., during penetration. In other words, it is the reversal of direction of the impinging object at very high rates of acceleration in both directions that causes the injury.

My material is unique in that it reverses the direction of the impinging object at relatively low rates of acceleration in both directions. This will be more fully explained below.

The test apparatus for determining the shock absorption characteristics of the compositions of this invention is a pendulum type impact test device consisting of a massive base and freely mounted pendulum. The striking member of the pendulum consists of a 4 inch diameter metal hemisphere located at the center of percussion of the system. The receiver against which test specimens are mounted is vertical and in a plane parallel with the pendulum arms when the pendulum is in an equilibrium position, and is at right angles to the plane of action of the pendulum. The receiver is located on the base in such a manner that the indentor of the pendulum just contacts the sample when the sample is firmly in contact with the receiver and the pendulum is in an equilibrium position.

A predetermined level of impact energy is obtained by releasing the pendulum from a previously calculated angular position away from equilibrium.

A linear accelerometer (transducer) is mounted on the pendulum immediately behind the center of the striking hemisphere. This transducer faithfully responds to the accelerations produced during the course of impact, and through the use of suitable recording oscillographs a permanent record of the acceleration-time characteristics of the pendulum during the course of impact with the test specimen is obtained. These acceleration-time data are used to determine the maximum rate of change of acceleration during both penetration and emergence of the indentor and also the maximum acceleration of the pendulum during contact with the test specimen. The resulting values characterize the shock-absorbing qualities of the test specimen.

All data mentioned herein were obtained at room temperature on test pads one inch in thickness, ten inches high and twelve inches wide, situated on the test machine so that contact with the indentor of the pendulum occurred at the approximate center of the specimen.

Using the foregoing testing procedure and apparatus in which the energy level of the indentor is equivalent to ten foot-pounds, at a velocity of five feet per second, materials of my invention exhibit a maximum value of 950 $g$'s ($g$=acceleration due to gravity) per second both during penetration and emergence, and exhibit a maximum acceleration of 9 $g$'s during the entire period of impact. This maximum acceleration always occurs at the point of zero velocity i. e., the point of change of direction.

In comparison, foam rubber made entirely from natural rubber gives a value of 1380 $g$'s per second during penetration, a value of 1570 $g$'s during emergence, and a maximum acceleration of 11.6 $g$'s. This was a special foam rubber having a density of 21.0 pounds per cubic foot and a compressive resistance of 8.5 pounds per square inch. Another sample of foam rubber (also natural rubber) having a density of 17.9 pounds per cubic foot and a compressive resistance of 4.7 pounds per square inch exhibited values of 5910 and 5200 $g$'s per second during penetration and emergence respectively, and a maximum acceleration of 21.3 $g$'s. Thus it will be seen that foam rubber is incapable of yielding the results of my invention. The same is true of sponge rubber.

The material of my invention is highly flexible which is advantageous because it enables the material to be shaped to conform to the base upon which it is installed.

The proportions of vinyl resin, butadieneacrylonitrile elastomer and liquid plasticizer are highly critical and any substantial departure therefrom will result in compositions unfit for the intended use. For example, when the plasticizer is reduced materially below 14%, the maximum acceleration and the rate of change of acceleration exceed the permissible values for a satisfactory material. If the plasticizer level is increased much above 20%, the resultant composition is too soft to withstand shock and exhibits excessively high acceleration values. If the elastomer level is below 20%, the rate of change of acceleration is excessive during emergence, and is often excessive during penetration; in other words the rebound is excessive. If the elastomer content is materially above 38%, all acceleration values become excessive.

As the vinyl resin component, I usually employ either polyvinyl chloride or a copolymer of a major proportion of vinyl chloride and a minor proportion of vinyl acetate. Instead of vinyl acetate there may be employed any other monomer which is copolymerizable with vinyl chloride and which contains an ethylenic group, e. g., diethyl maleate, diethyl fumarate, vinylidene chloride, etc.

As the elastomer, I can use any rubbery copolymer of butadiene and acrylonitrile. The combined acrylonitrile content generally ranges from 15 to 40%, the balance being butadiene.

Any high-boiling organic liquid plasticizer for the vinyl resin can be used. The plasticizer should be compatible with the elastomer. It usually is an ester, ether or ketone. Dioctyl phthalate gives unusually satisfactory results. I have also used diocyl sebacate, linear polyester resin plasticizers such as disclosed at Ind. Eng. Chem., 37, 504 (1945), for example "Paraplex G–50" manufactured by Rohm & Haas, and a plasticizer made by introducing epoxy groups into a drying oil, e. g., soybean oil. "Paraplex G–60" is understood to be an example of the latter type of plasticizer. This latter type of plasticizer is especially preferred because of its unusual ability to stabilize vinyl chloride resins against thermal degradation. I can use a mixture of organic liquid plasticizers, e. g., a mixture of dioctyl phthalate and "Paraplex G–60."

The following examples illustrate my invention more fully:

EXAMPLE 1

The following formulation was used:

| | Parts by weight |
|---|---|
| "Vinylite VYNW" (copolymer of 95% vinyl chloride and 5% vinyl acetate) | 58.3 |
| "Paracril C" (rubbery copolymer of 35% acrylonitrile and 65% butadiene) | 41.7 |
| Dioctyl phthalate | 16.4 |
| "Unicel ND" (dinitrosopentamethylenetetramine —40% active) | 18 |
| Coumarone-Indene Resin (tackifier and processing aid) | 5 |
| 2,5-di-tertiary butyl meta-cresol | 5 |
| Calcium silicate | 5 |
| Zinc oxide | 3 |
| Calcium stearate | 3 |
| Stabilizer for vinyl resin | 6 |
| Stearic acid | 1 |
| Salicylic acid | 1 |
| Benzothiazyl disulfide (vulcanization accelerator) | 0.5 |
| Sulfur | 2 |
| "Agerite Stalite" (mono- and di-heptylated diphenylamines) | 1 |

All of the above ingredients except the Paracril C and Agerite Stalite were dry blended in a Hobart mixer to a uniform mixture. The Paracril C was banded on a cold rubber mill whereupon the Agerite Stalite was incorporated therewith on the cold mill after which the uniform blend of the dry ingredients was incorporated with the Paracril-Agerite Stalite mixture on the cold mill. Milling was continued until a homogeneous dispersion was obtained. Care was taken to keep the temperature of the mix below 180° F. to avoid fusion and decomposition of the blowing agent. The mixture at this point contained the elastomer in the continuous phase with the Vinylite, plasticizer and other ingredients in the discontinuous phase. This mixture was calendered to form a smooth sheet which was then plied up to the desired thickness, say ½", and molded under pressure at 305° F. for 20 minutes, without permitting expansion, to form a unitary sheet and initiate decomposition of the blowing agent. This sheet was cooled under pressure and removed from the mold. The sheet was then heated in an oven, under conditions permitting free expansion, at 340° F. for 30 minutes. During this heating step the volume of the pressed sheet increased about 1000%. The thickness of the resulting sheet was approximately 1". Its physical properties were as follows:

Density _____ 9.9#/cu. ft.
Compressive resistance of 25% deflection _____ 8.8#/sq. in.
Shock absorption:
　Maximum acceleration _____ 6.2 g's.
Rate of change of acceleration:
　During penetration _____ 830 g's/second.
　During emergence _____ 730 g's/second.

EXAMPLES 2 TO 19

Example 1 was duplicated except that the proportions of resin, elastomer and liquid plasticizer were changed to those indicated in the following Tables I to III which also include data on the resulting products:

Table I

| Example | 2 | 3 | 4 | 5 | 6 | 7 | 8 |
|---|---|---|---|---|---|---|---|
| "Vinylite VYNW" | 80 | 80 | 80 | 75 | 75 | 75 | 75 |
| "Paracril C" | 20 | 20 | 20 | 25 | 25 | 25 | 25 |
| Dioctyl Phthalate | 20 | 25 | 30 | 15 | 20 | 25 | 30 |
| Density (#/cu. ft.) | 6.6 | 5.7 | 5.7 | 4.9 | 5.7 | 5.8 | 5.7 |
| Maximum Acceleration (g's) | 8.3 | 9.2 | 10.2 | 11.5 | 6.6 | 8.8 | 9.8 |
| Rate of Change of Acceleration (g's per second): | | | | | | | |
| During penetration | 1,280 | 1,400 | 690 | 1,500 | 870 | 720 | 660 |
| During emergence | 1,190 | 1,700 | 1,400 | 1,600 | 870 | 1,200 | 1,200 |

Only Example 6 of Table I is within the invention.

Table II

| Example | 9 | 10 | 11 | 12 | 13 |
|---|---|---|---|---|---|
| "Vinylite VYNW" | 70 | 70 | 70 | 65 | 65 |
| "Paracril C" | 30 | 30 | 30 | 35 | 35 |
| Dioctyl Phthalate | 20 | 10 | 25 | 15 | 20 |
| "Paraplex G-60" | | 10 | | | |
| Density (#/cu. ft.) | 5.3 | 5.4 | 5.5 | 5.1 | 5.3 |
| Maximum Acceleration | 6.0 | 6.9 | 8.1 | 8.8 | 5.7 |
| Rate of Change of Acceleration: | | | | | |
| During penetration | 630 | 860 | 640 | 1,100 | 540 |
| During emergence | 730 | 910 | 800 | 950 | 700 |

Example 12 of Table II is outside of the invention because of its low plasticizer content.

Table III

| Example | 14 | 15 | 16 | 17 | 18 | 19 |
|---|---|---|---|---|---|---|
| "Vinylite VYNW" | 60 | 60 | 60 | 60 | 55 | 50 |
| "Paracril C" | 40 | 40 | 40 | 40 | 45 | 50 |
| Dioctyl Phthalate | 10 | 15 | 20 | 10 | 20 | 20 |
| "Paraplex G-60" | | | | 10 | | |
| Density (#/cu. ft.) | 5.5 | 4.9 | 5.3 | 9.7 | 10.0 | 7.3 |
| Maximum acceleration | 11.1 | 9.0 | 7.2 | 6.3 | 6.7 | 15.6 |
| Rate of Change of Acceleration: | | | | | | |
| During penetration | 1,500 | 520 | 770 | 880 | 510 | 4,410 |
| During emergence | 1,500 | 1,100 | 910 | 790 | 840 | 3,970 |

Examples 14 and 15 of Table III are outside the invention because of low plasticizer content. Example 19 is outside the invention because of its high elastomer content. The marked difference in the properties of the materials of Examples 18 and 19 due to a seemingly slight change in elastomer content is noteworthy.

The materials of my invention are extremely useful wherever shock absorption is desired, for example, athletic protective equipment such as boxing ring mats, liners for football helmets, shoulder pads, knee pads, etc., containers for shock-sensitive devices such as detonating equipment, electronic equipment, optical instruments, etc., containers for military equipment to be dropped by parachute, shock-padding in passenger compartments of vehicles of all types including motor vehicles, airplanes, military tanks, naval vessels, etc.

It should be understood that although the acceleration data reported above are given in absolute units, and are believed to be entirely accurate, the data should be employed to indicate the relative shock absorbing properties of the compositions described herein.

I claim:
1. A composition of matter having unusual shock absorbing characteristics comprising a vulcanized unicellular mixture of a vinyl resin selected from the group consisting of polyvinyl chloride and copolymers of a major proportion of vinyl chloride and a minor proportion of a copolymerizable monomer selected from the group consisting of vinyl acetate, diethyl maleate, diethyl fumarate and vinylidene chloride, a butadiene-acrylonitrile rubbery copolymer containing from 15 to 40% of combined acrylonitrile, and a high-boiling organic liquid plasticizer for said resin, said plasticizer being compatible with said rubbery copolymer and being selected from the group consisting of esters, ethers and ketones, the aforementioned components being employed in relative proportions of from 42 to 66% of said resin, from 20 to 38% of said rubbery copolymer, and from 14% to a value substantially below 20% of said plasticizer, said percentages being based on the sum of said constituents and totalling 100% said mixture having a density of not over 10 pounds per cubic foot and a compressive resistance at 25% compression of from 4 to 10 pounds per square inch.

2. A composition as set forth in claim 1 wherein said resin is a copolymer of vinyl chloride and vinyl acetate.

3. A composition as set forth in claim 1 wherein said plasticizer is dioctyl phthalate.

4. A composition as set forth in claim 1 wherein said plasticizer is a mixture of dioctyl phthalate and plasticizer composed of a drying oil containing added epoxy groups.

5. A composition as set forth in claim 1 wherein said constituents are employed in proportions approximating 50% of said resin, 35% of said rubbery copolymer and 15% of said plasticizer.

6. A composition of matter having unusual shock absorbing characteristics comprising a vulcanized unicellular mixture of a resinous copolymer of approximately 95% vinyl chloride and 5% vinyl acetate, a rubbery copolymer of approximately 35% acrylonitrile and 65% butadiene, and a high-boiling organic liquid plasticizer for said resinous copolymer, said plasticizer being compatible with said rubbery copolymer and being selected from the group consisting of esters, ethers and ketones, in relative proportions of from 42 to 66% of said resinous copolymer, from 20 to 38% of said rubbery copolymer, and from 14% to a value substantially less than 20% of said plasticizer, said percentages being based on the sum of said constituents and totalling 100%, said mixture having a density of not over 10 pounds per cubic foot and a compressive resistance at 25% compression ranging from 4 to 10 pounds per square inch.

References Cited in the file of this patent
UNITED STATES PATENTS
2,570,182　　Daly et al. _____ Oct. 9, 1951

OTHER REFERENCES

Young et al.: Ind. and Eng. Chem., November 1947, vol. 39, No. 11, 1446–1452.

Young et al.: Ind. and Eng. Chem., February 1949, vol. 41, No. 2, pages 401–408.